US008544071B1

(12) United States Patent
Cato et al.

(10) Patent No.: US 8,544,071 B1
(45) Date of Patent: Sep. 24, 2013

(54) SYSTEMS AND METHODS FOR SOFTWARE APPLICATION SECURITY MANAGEMENT

(75) Inventors: David Cato, San Antonio, TX (US); Bryan Bice, Mandeville, LA (US); Tammy Sanclemente, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1202 days.

(21) Appl. No.: 11/584,773

(22) Filed: Oct. 19, 2006

(51) Int. Cl.
*H04L 29/06* (2006.01)

(52) U.S. Cl.
USPC .................................................. 726/6

(58) Field of Classification Search
USPC .................................................. 726/6
See application file for complete search history.

(56) References Cited

U.S. PATENT DOCUMENTS

| | | | | |
|---|---|---|---|---|
| 5,606,663 | A | * | 2/1997 | Kadooka ............... 726/18 |
| 5,719,941 | A | * | 2/1998 | Swift et al. ............ 713/155 |
| 5,734,718 | A | * | 3/1998 | Prafullchandra ....... 713/183 |
| 6,834,112 | B1 | * | 12/2004 | Brickell ................. 380/279 |
| 6,957,229 | B1 | * | 10/2005 | Dyor ................. 707/103 X |
| 8,055,904 | B1 | | 11/2011 | Cato et al. |
| 2004/0190722 | A1 | * | 9/2004 | Grobman ............... 380/277 |
| 2005/0182969 | A1 | * | 8/2005 | Ginter et al. ............ 713/201 |

OTHER PUBLICATIONS

*Password Management Best Practices*, Obtained from http://psynch.com/docs/password-management-best-practices.pdf, M-Tech Information Technology, Inc., Calagary, Canada,(2004),16 p.
*Microsoft Solutions for Security and Compliance: Password Management*, Microsoft Identity and Access Management Series, Microsoft Corporation,(2006),75 p.
*Site Security Handbook*, Fraser, B., (ed.), Network Working Group, Request for Comments: 2196,(Sep. 1997),75 p.
Barrett, R. , et al., "Field Studies of Computer System Administrators: Analysis of System Management Tools and Practices", *Proceedings of ACM CSCW '04*, Chicago, IL,(Nov. 6-10, 2004),8 p.
Sandhu, R. , et al., "Authentication, Access Control, and Audit", *ACM Computing Surveys*, 28, (Mar. 1996),241-243.
U.S. Appl. No. 11/760,718, Cato.

* cited by examiner

*Primary Examiner* — Jeffrey D Popham
(74) *Attorney, Agent, or Firm* — Brooks, Cameron & Huebsch, PLLC

(57) ABSTRACT

Systems ands methods for managing service account security are described. The apparatus may include a security record data store that contains information regarding a plurality of service records, a retrieval module coupled to the security record data store to retrieve security record information and a user interface module to convey the security record information to one or more users. The method may include retrieving information regarding one or more security records, conveying the information to the user and updating the information if the user indicates a change in the information.

17 Claims, 11 Drawing Sheets

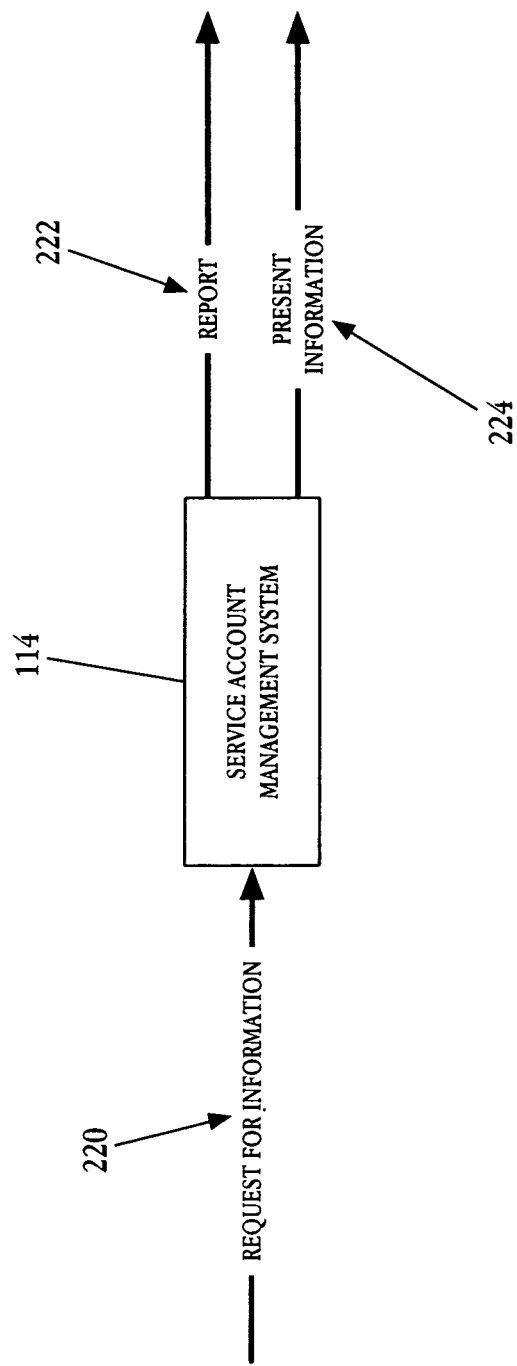

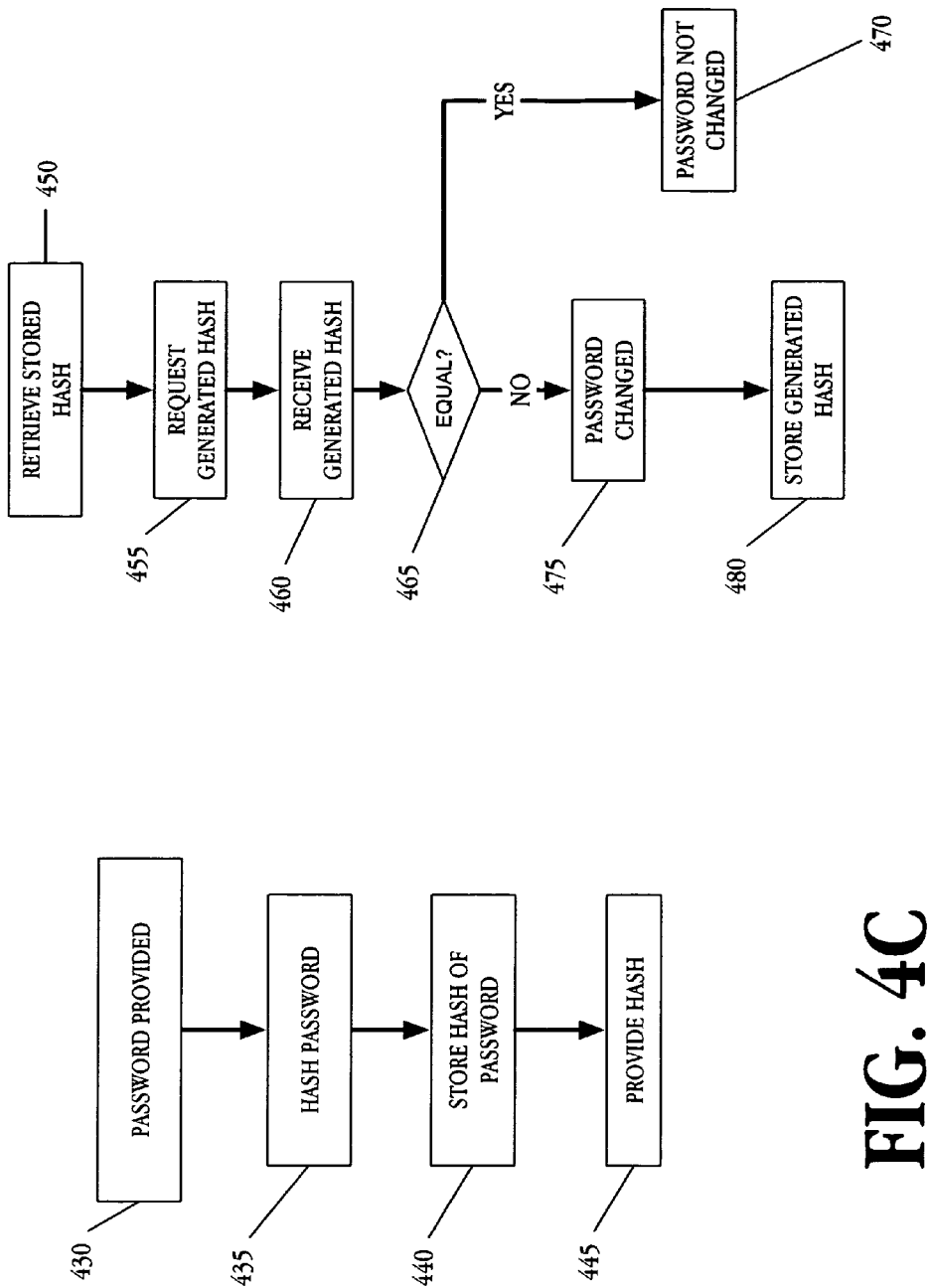

SYSTEMS AND METHODS FOR SOFTWARE APPLICATION SECURITY MANAGEMENT

RELATED APPLICATIONS

This disclosure is related to pending U.S. patent application Ser. No. 11/584,138, titled "SYSTEMS AND METHODS FOR SOFTWARE APPLICATION SECURITY MANAGEMENT," filed on an even date herewith.

TECHNICAL FIELD

This application relates to systems and methods that manage software application security and more particularly to systems and methods that manage the authentication credentials used by background software applications.

BACKGROUND

As a company grows and increases its customer base as well as expands its offerings to its customer, more devices are needed to store and process the information needed to service those customers. These computers may be networked across many rooms in a single building, across multiple buildings on a corporate campus, or across multiple locations separated by hundreds of miles and only connected through commodity Internet connections.

The complexity of these networked systems increase dramatically as more and more devices are deployed to service those customers, as well as employees. In addition, the need to interconnect these systems and facilitate information exchange between them also increases. One method of exchanging information between these systems is to require an operator to positively launch processes on the systems in order to facilitate that information exchange. Another method is for those processes to be coded with access information within them. This access information may include just the network location of the second system, but in some cases may also include password information needed to authenticate the first system to the second system. However, in many cases the password information is embedded in the individual systems, or what is known as hard-coding. When the original developers of these systems leave the company, the information about those passwords may go with them, creating a situation where the systems are still able to operate, but no one remembers how.

SUMMARY

In an embodiment, service account security is managed by a method that includes retrieving information regarding one or more security records, conveying that information to a user, and updating the information if the user indicates a change in the information. The service record is associated with, in one example, a service account, which is a background software application that authenticates itself with a password. In an alternate embodiment, service account security is managed by an apparatus having machine-readable instructions which when executed cause one or more software modules to be executed. The one or more software modules can include, in some examples, a security record data store that contains information regarding a plurality of service records, a retrieval module that is coupled to the security record data store and can request and retrieve security record information and a user interface module which conveys security record information to a user.

BRIEF DESCRIPTION OF DRAWINGS

Embodiments are illustrated by way of example and not limitation in the figures of the accompanying drawings, in which like references indicate similar elements and in which:

FIG. 2 shows a high-level block diagram of an apparatus for providing software application security management, in accordance with an example embodiment;

FIGS. 4A-4D show flowcharts of methods of accessing and maintaining software application security settings, in accordance with an example embodiment;

DETAILED DESCRIPTION

The following detailed description is divided into four sections. The first section presents an overview of embodiments of the inventive subject matter with reference to a system for software application security management. The second section presents apparatus and systems according to embodiments. The third section provides methods of using example embodiments of the inventive subject matter. The fourth section describes an example system implementation and an alternative system implementation of the inventive subject matter.

OVERVIEW

Figure 1:
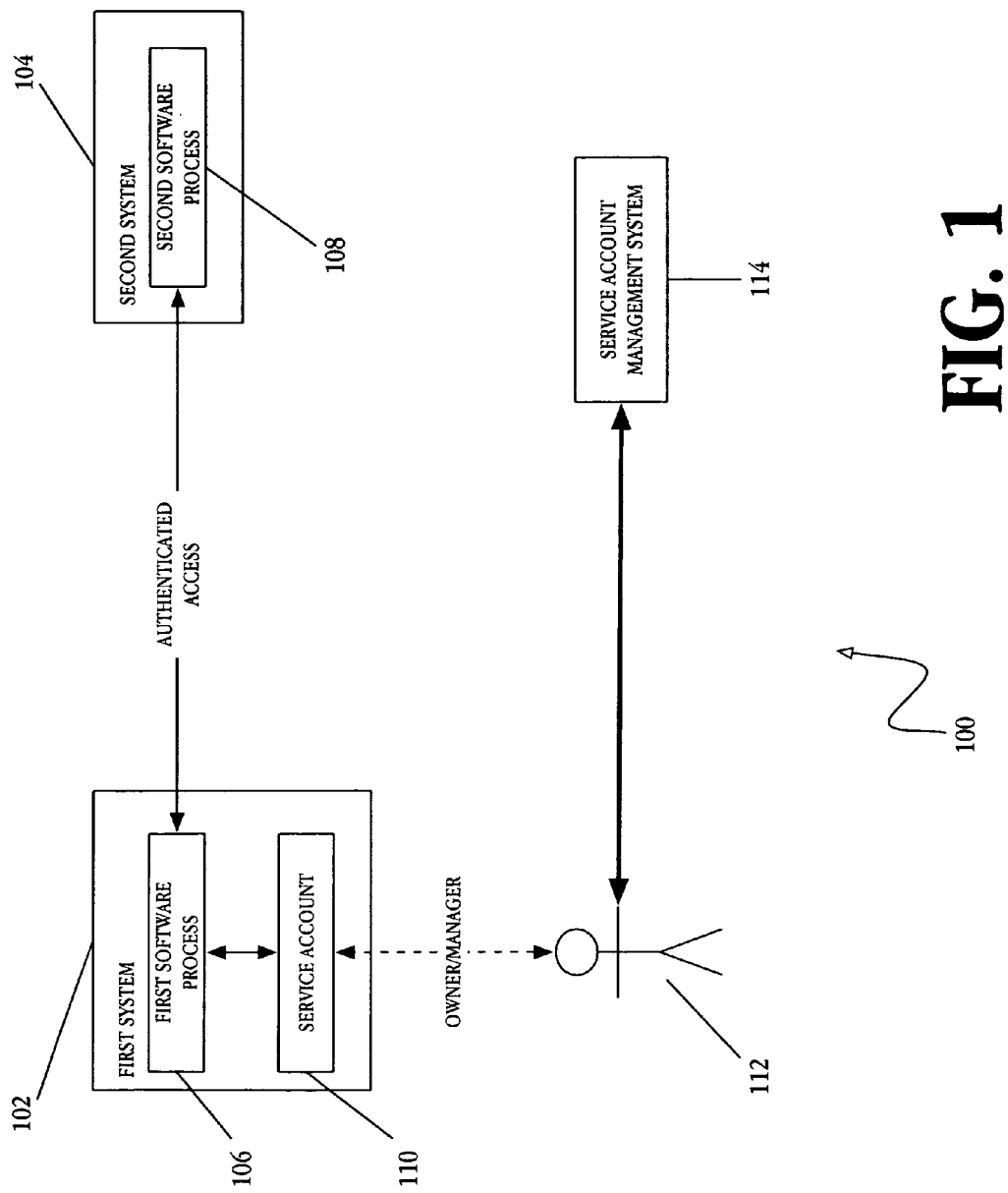
FIG. 1 shows a high-level block diagram of a system of software application security management, in accordance with an example embodiment.

FIG. 1 shows a high-level block diagram of a system of software application security management, in accordance with an example embodiment. The system 100 includes a first computer system 102 and a second computer system 104 coupled across a network. The first computer system 102 and the second computer system 104 each include one or more software processes 106 or 108, in one example. The first computer system 102 additionally includes a service account 110. The service account is a background software process that is executed on a computer system which requires no user intervention for execution or operation. The service account may require the use of a password for authentication. Password as user herein, includes a password or passphrase as are commonly known with respect to user authentication.

The service account 110, in some examples, issues instructions to either the first software process 106 or the second software process 108 or both, that cause those processes to perform some function. The service account 110 is owned or managed by a user 112. This user may include an owner, manager or executive. The owner has primary responsibility for the operation of the service account 110, including any passwords which the service account 110 uses for authentication. The manager is an individual who is in a superior organizational position then the owner and oversees the work of the owner. The manager has secondary responsibility for the maintenance of the service account 110. The executive is an individual who is in a superior organizational position then the manager and oversees the work of the manager. The executive may have, in some examples, tertiary responsibility for the maintenance of the service account 110.

In an embodiment, the service account 110 is a software application that is configured to issue instructions to one or more computer systems intended to cause the one or more computer systems to perform a function. One example of such a function is the execution of an overnight batch process that retrieves daily transaction logs from a computer. Using the systems depicted in FIG. 1 to further explain, the first computer system 102 maintains credit card accounting data for a credit card issuing institution. During the day, the second computer system 104 processes credit card authorizations from merchants and stores transaction data for those transactions. During the overnight time, the bank that issues those credit cards retrieves those transactions and posts the transactions to individual user accounts. To facilitate that retrieval, the first computer system 102 needs to request the daily transaction log from the second computer system 104. However, what is being stored in the transaction log is financial data that, if disclosed, could result in fraudulent activity. In order to ensure that only authorized processes can retrieve such information, the second computer system may require a password before allowing the data to be sent. The service account 110 can store this password internally, in one example, or retrieve a password securely from a central data store. In either case, the service account 110 supplies password credentials to the second computer system 108, which when verified, authenticate the service account as an authorized user. The transaction log can then be sent from the second computer system 104 to the first computer system 102 for further processing. Use of a credit card transaction is merely meant to be illustrative and not limiting. Any interaction between computer systems that requires password authentication for processing and the use of a background process for initiation, and does not involve any user input during processing, is considered to be within the scope of the present discussion.

In an embodiment, the service account management system 114 provides to the user the ability to update security records with respect to the service accounts that the user owns or manages. The security records are data records that contain at least password maintenance date information for a service account and an identification of the owner of the service account. The identification of the user may include, without limitation, the user's name and contact information, a service account process identification which can be used as a key to retrieve the user information from a second data store, an identifier that can be used as a key to retrieve the user information from a second data store and the like. In the latter two examples, the security record need maintain no direct identification of the user, but merely provide a method for other systems to retrieve the user and their contact information. Service accounts may perform more than one operation, where the multiple operations require individual passwords. In such an example, the service account management system 114 may store each of those individual password records in one security record, that record storing all the associated security records for the service account. In an alternate example, each of those individual password records may be stored in one security record such that a single service account may have multiple security records stored and managed by the service account management system 114. Though the term security record is used herein, the record maintains nothing more then date information with regards to password changes for a service account and either identification of the user or a means to identify the user through other systems.

Systems

FIG. 2 shows a high-level block diagram of an apparatus for providing software application security management, in accordance with an example embodiment. In an embodiment, the service account management system 114 receives a request for information 220 from a user as an input. The service account management system 114 outputs either a report 222 or present information 224 regarding a service account, or both. The report may be delivered in a user interface displayable on a computer device operated by the user, or may be delivered in any suitable electronic message sent to the user periodically. In either case, the report is sent to the user so that the user can perform future actions as appropriate. The present information may be sent from the service account management system to other computer systems for further processing, or displayed to the user.

In an embodiment, the request for information received from the user is received across a network from a computing device operated by the user. Expanding on the discussion above regarding user, the user may be either the owner or manager of the service account. The owner has primary responsibility for monitoring the security records of one or more service accounts. The manager has oversight responsibility for one or more service accounts, and in one embodiment, may be the manager of the owner. The manager may also be an executive level employee having responsibility for one or more managers, who in turn have oversight responsibility for one or more owners. In any of these examples, the owner, manager, or executive is considered a user within the context of the present discussion.

Figure 3A:
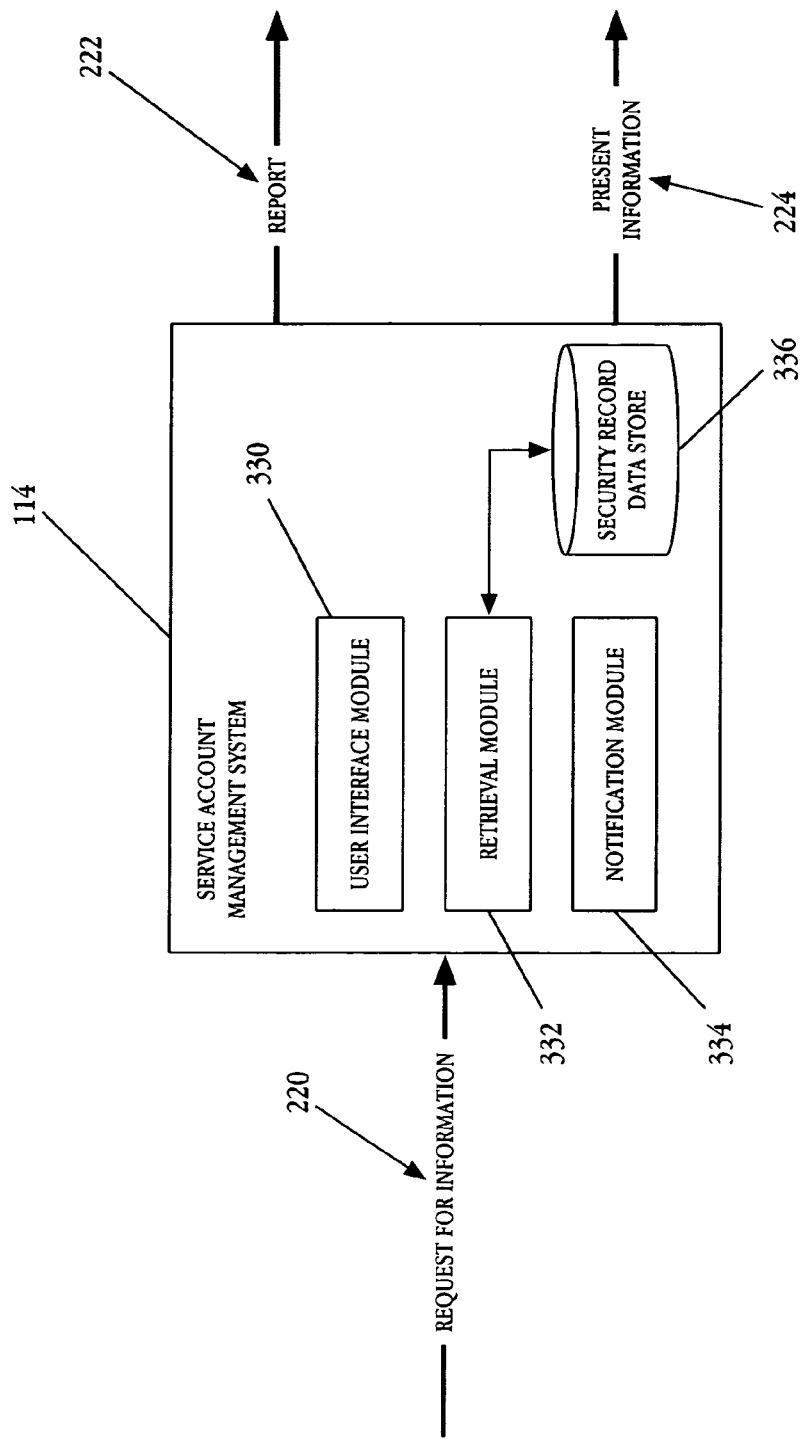
FIG. 3A shows a more detailed block diagram of an apparatus for providing software application security management, in accordance with an example embodiment.

FIG. 3A shows a more detailed block diagram of an apparatus for providing software application security management, in accordance with an example embodiment. The apparatus depicted in FIG. 3A is a more detailed depiction of the apparatus described above with respect to FIG. 2. In one embodiment, the service account management system 114 includes a user interface module 330, a retrieval module 332, and a notification module 334. The retrieval module 332 may be additionally coupled to a security record data store 336, in some examples. The security record data store 336 may be combined with the retrieval module 332 as one software module.

In an embodiment, the user interface module 330 is configured to generate a user interface through which a user can select one or more security records for display and action. The user interface module 330 receives the request for information 220 from the user and displays either a report 222 or present information 224 in regards to one security record. The user, through the use of the user interface, can supply updated information to the security account management system with regards to one or more service accounts.

In an embodiment, the retrieval module 332 is configured to retrieve the security records for one or more service accounts. The retrieval module is coupled to the user interface module 330 and receives instructions from the user interface module, in one example, directing the retrieval module 332 to retrieve the security records. The retrieval module 332 is additionally configured to manage the security records data store 336. For example, the user requesting information from the service account management system may have updated information to supply to the system, such as a recent change to the security records of a service account. The retrieval module, in such an example, is configured to update the security records of that service account in the security records data store 336.

In an embodiment, the notification module 334 is coupled to the retrieval module 332 and is configured to periodically check security records for recent updates and compliance with security policy. For example, a particular service account may require that the password be changed every 90 days. The notification module 334, in this example, would request the status of a particular security record. In one embodiment, the notification module 334 is configured to retrieve the security record and verify that a security record has been updated and, if not, to send a message requesting update to the owner of the service account associated with the security record. The notification module 334 may be alternatively configured to send instructions to the retrieval module 332 that cause the retrieval module 332 to send to the notification module 334 any security record that requires updating in a future time period (such as, the next week, next month, etc). Through such functionality, the notification module 334 can send an electronic message to the owner of the service account notifying them that the security record requires updating. In a further embodiment, the notification module 334 can escalate the electronic messages, such that the manager or executive, or both, are additionally notified of upcoming deadlines for the updating of the security record.

No mention has been made in the previous discussion with regards to the service account management system 114 receiving an updated password from the user or updating passwords for a service account. The service account management system 114 and all associated subsystems are free of any password information. If the service account management system 114 maintained passwords for the service accounts such that they could be updated within the system by users, it would represent an additional level of insecurity in operations. As the service account management system 114 is intended to manage security records for many service accounts, the exploiting of information within its security records would result in the insecurity of those many service accounts. The password information that is not stored by the service account management system 114 is maintained in a central data store, such as a password repository, which will be described below. The user, through interaction with that central data store, can affect a change to the password. Once that password is changed, the user can, through interaction with the service account management system 114, indicate that the password has been changed. This two level system of change and update provides a layer of security between the security records that track the password change dates and the actual passwords. Through this layering, the security of password can not be compromised by any insecurities in the service account management system 114.

Though not depicted in FIG. 3A, a discussion with regards to the service accounts may be appropriate with respect to password maintenance. Each of the service accounts 110, as discussed herein, require a password to perform whatever function it was developed for. In some instances, the program developer may have chosen to hard-code the password into the service account 110. In a large deployment with many networked systems, this can result in thousands of hard-coded passwords. In order to update those passwords, the source code must be modified, recompiled, and then re-deployed. Additionally, when the original developer of the service account 110 leaves the company, a security vulnerability is added into the system as well as the uncertainty of which service accounts are running on the network and what they are doing. In an embodiment, each of the service accounts 110 accesses a password repository and securely retrieves a password for a particular operation. This request/reply between the service account and the password repository may be secured through any suitable means and the exact method of securing is outside the scope of the present discussion. By removing the password from the service account itself, the ability for a service account owner to easily maintain all of the service account passwords they manage is increased.

However, even in light of a secure session between the service account and the password repository, the service account management system 114 still retains no password information within it. By the use of this mechanism, the management of the security records can be kept separate from the actual passwords themselves.

Figure 3B:
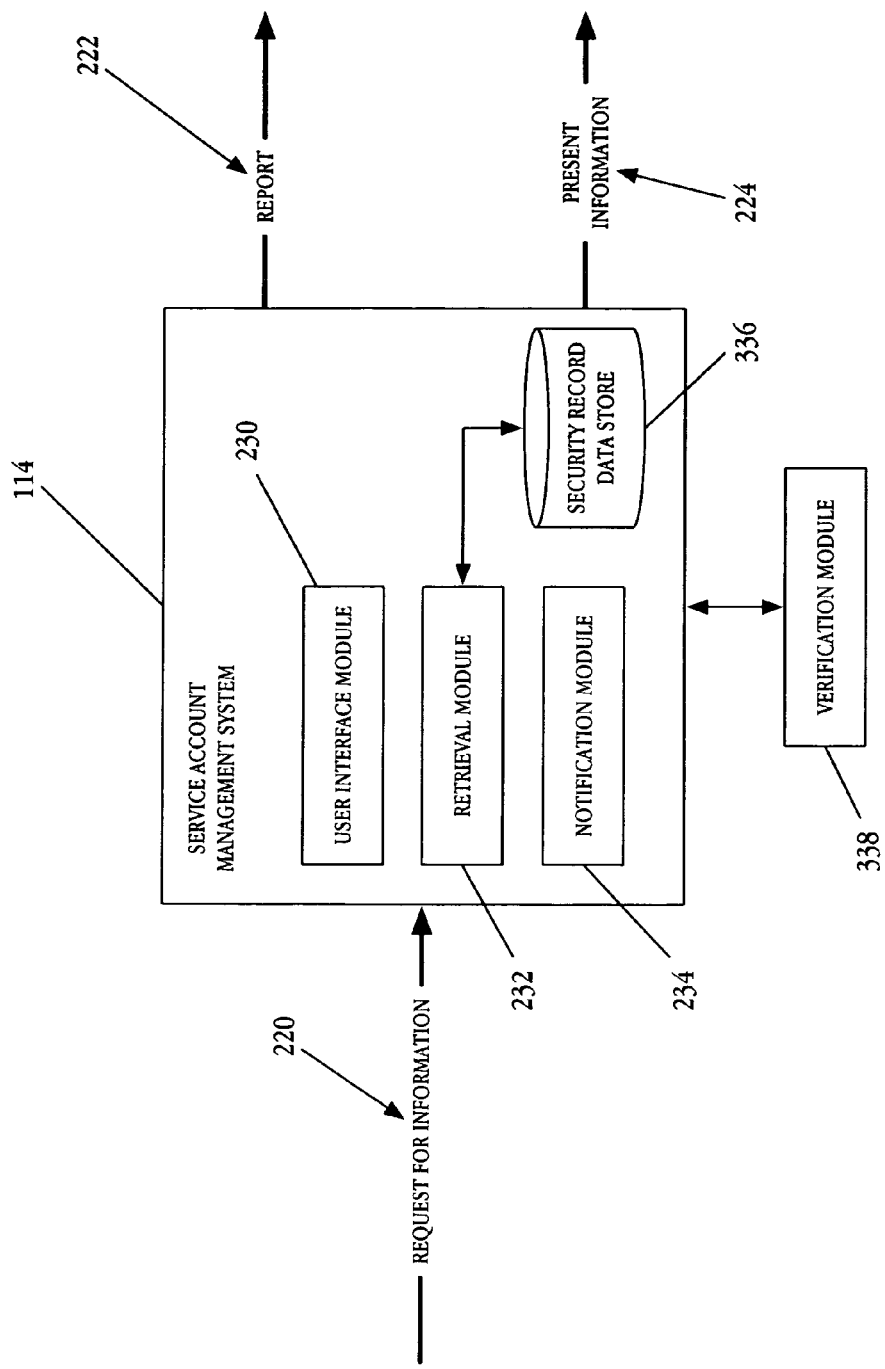
FIG. 3B shows a more detailed block diagram of an alternative apparatus for providing software application security management, in accordance with an example embodiment.

FIG. 3B shows a more detailed block diagram of an alternative apparatus for providing software application security management, in accordance with an example embodiment. The apparatus depicted in FIG. 3B is similar to that depicted above with respect to FIG. 3A with the addition of a verification module 338. Though depicted as a separate module from the service account management system 114 and coupled to the service account management system, the verification module 338 may be an additional software module of the service account management system in some embodiments.

In an embodiment, the verification module 338 is coupled to the service account management system 114 and is configured to, upon request, verify a state of a password for one or more service accounts in the password repository. As discussed above, the security of the passwords in the password repository is a primary reason why the service account management system 114 maintains no password information in a data store. In order to maintain this level of separation, in some examples, the verification module verifies the state of a password and not the password itself. One method of doing so would be to verify a hash of the password using a one-way hashing algorithm. The hashing function inputs the password and outputs a checksum. It is computationally infeasible to reverse the algorithm, so the ability of someone who had access to the checksum to derive the password from just the checksum is improbable. Additionally, any change to the actual password will result in a different hash, so by comparing hashes stored by the password repository and the verification module 338, the change in a password by the owner can be verified.

In one embodiment, the password repository described above hashes a password supplied to it and in addition to storing the hash along with the password will supply the hash to the verification module 338. In an alternate embodiment, and in the interests of further securing and maintaining a separation between the management of the records and the actual passwords themselves, the password repository can perform a second hash, or hash the hash of the password, and supply this second hash to the verification module 338. The verification module 338 may, in some examples, store the second hash, or the first hash as described above, within a data store internal to the verification module 338, or it may be stored within the security records in the security record data store. In the latter example, the verification module 338 retrieves the second hash, or the first hash, from the security record data store 336 and supplies that hash to the password repository. In the example of the verification module 338 being supplied the first hash, the verification module would send the first hash to the password repository. The password repository would compare that value to a present hash of the password, returning a true or false with regards to the equality of the checksums. If true, the hashes are equal, and the password has not been changed. If false, the hashes are not equal and the password has been changed. In the example of the verification module 338 being supplied the second hash, the verification module 338 would send the second hash to the password repository. The password repository would compare that hash to a hash of the first hash, and return values as described above. In this latter example, the actual password is never loaded into memory, increasing its security.

Methods

Figure 4A:
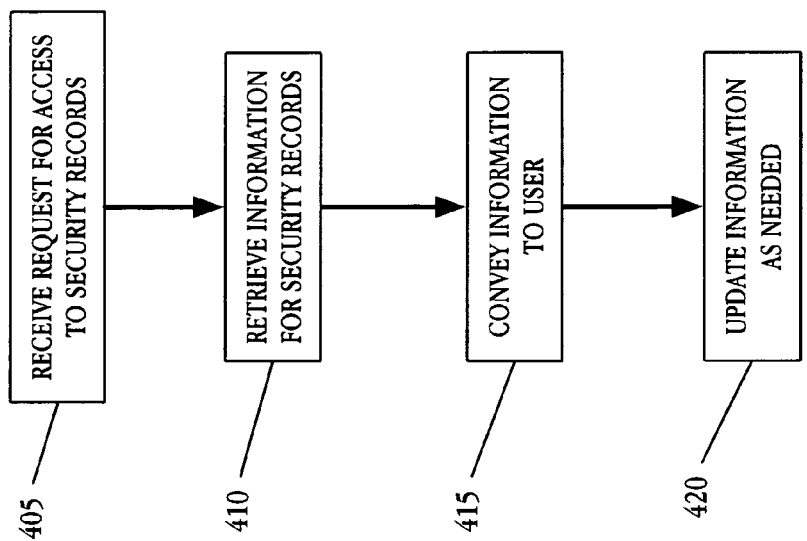

FIG. 4A shows a flowchart of a method of accessing and maintaining software application security settings, in accordance with an example embodiment. In an embodiment, the method depicted in FIG. 4A may be carried out by the service account management system shown in FIGS. 3A and 3B and described above.

At block 405 a request for access is received from a user. The request for access is a request for access to one or more security records, in one example. The one or more security records are associated with at least one service account owned or managed by the user. The service record contains at least information with regards to the password change date, or password maintenance date and an identifier sufficient to identify the user. The security record may additionally contain an identification of the owner, manager or executive responsible for the service account. Alternately, the security record may contain merely identifiers of these users sufficient to retrieve user information from a second source. The security record may additionally contain information regarding the required periodicity for the changing of the password. For example, a password used by the service account to access secure systems may be required to be changed every 90 days. In this example, the security record, in addition to the date the password was changed, may contain the "change every 90 days" information. Additional information regarding the service account may be contained within the security record, such as Unique ID of the service account, system the service account is executed on, systems the service account accesses, versioning information, and the like.

At block 410, information from the security record is retrieved. This may be some or all of the information contained within the security record. If only some of the information is retrieved at block 410, additional information may be requested to comply with further user requests, in some examples. At least the password change date information and identification of the service account associated with that information should be retrieved at block 410. At block 415 the information retrieved at block 410 is conveyed to the user. Depending on the mechanism that requests the data, the information may be graphically displayed such as through the use of a web browser or a client application. In either of these two examples, the user interface module 330 sends instructions to the computing device operated by the user that would cause that computing device to graphically display that information. In the case of a web browser operating on the computing device, the user interface module 330 sends a suitable markup language formatted document, such as hyper-text markup language (HTML) or extensible markup language (XML), over a suitable protocol, such as hyper-text transfer protocol (HTTP), to the computing device. A web browser operating on the computing device receives the document and displays the document for viewing by the user. In an alternate embodiment, the conveying performed at block 415 is through the use of an automated report. This may be the result of a periodic routine run by the service account management system 114. Such a routine could, for example, be executed every night and identify any security records where the password has not been changed in the last year. In this example, the conveying of the information at block 415 would be through the use of a report sent to the owner or manager of the service accounts where the password has not been changed in the last year.

The method may additionally include at block 420 receiving updated information from the user. As the user may only be requesting status of the various service accounts they are responsible for, updating may not be required. However, if the user has changed the password, accessing the service account management system and use of the method shown here would provide the user the ability to note that the password has been changed for that particular service account.

In a further embodiment, when the updated information is received at block 420, a confirmation message may be sent to the owner of that particular service account. The message may additionally be sent to the manager and executive associated with that service account. With respect to sending messages to the manager and executive, the service account management system 114 may periodically, i.e. once a week, send a message detailing which service accounts have had their passwords updated in that previous week. Through such an operation, the amount of message traffic being sent to managers and executives can be reduced. However, this is not meant to be exclusive of sending an individual message for each updating of the password information by the owner, as some managers and executives may choose to exercise more direct control of the service account owners.

Figure 4B:
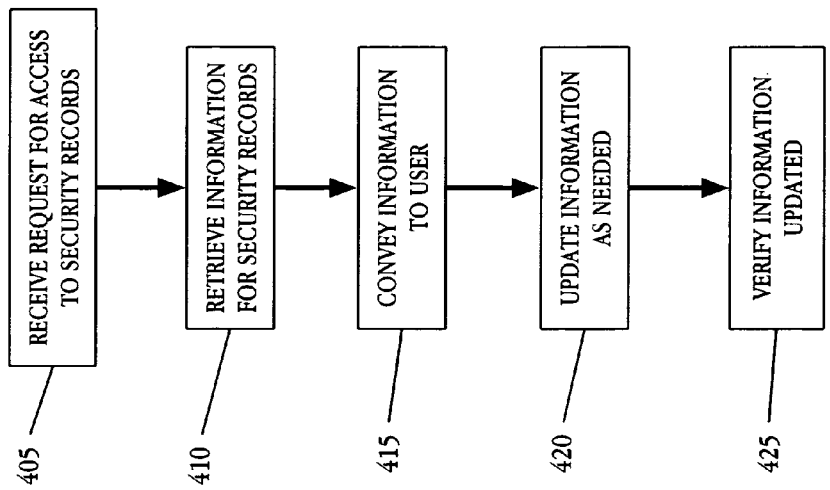

FIG. 4B shows a flowchart of a method of accessing and maintaining software application security settings, in accordance with an example embodiment. The method shown in FIG. 4B is similar to that shown in FIG. 4A with the addition of an additional verification operation at block 425.

Following the updating of the information at block 420 by the user, a check to verify that the password has actually been changed can be performed at block 425, in this embodiment. As discussed above, the service account management system 114 maintains no passwords within any data structures of the system, for security reasons. As a result, the service account management system is not the system in which the password is changed. That system is the password repository, as discussed above. FIG. 4C shows operations performed by the password repository preparatory to provide a cryptographically secure hash of the password to the service account management system when the password is first supplied to the password repository. FIG. 4D shows operations intended to verify that the password has changed.

At block 430, a password for a service account is provided. At block 435, the password is hashed to arrive at a checksum value using a one-way hashing algorithm such that it is computationally infeasible to derive the password from the hashed value. At block 440, the password repository stores the hashed value and at block 445 the hashed value is provided to the service account management system 114 in one embodiment. In an alternate embodiment, the hashed value is hashed a second time to obtain a second hash, which is provided to the service account management system.

The method shown in FIG. 4D can be carried out by the service account management system 114 in one example. At block 450, a stored hash is retrieved. This stored hash value was received from the password repository at some point prior to the verification operations such as when the password was first entered into the password repository. At block 455, a generated hash is requested from the password repository. The password repository, in response to the request, retrieves the password and performs a hash on that password, which is then sent back to the service account management system and received at block 460, in one embodiment. Alternately, in the case of a second hash being used, as discussed above, the first hash of the password is retrieved by the password repository and the generated hash is obtained by hashing the first hash. In the latter example, the password is never loaded into memory by the password repository, increasing the security of these operations. Through these operations, the password is never retrieved by the password repository for the purposes of verification, and in turn is never loaded into memory. Expanding on the discussion above with relation to the provision of the password at block 430 in the context of a second hash, the password repository would hash the password whenever one is provided, such as a change to the password. The password repository would first hash the password when supplied and then perform a second hash on the password, storing just the first hashed value.

At block 460, the generated hash is received by the service account management system 114 and compared to the stored hash at block 465. If the values are equal, which denotes no change to the password by the user, the service account management system returns a password not changed at block 470. If the values are not equal, the service account management system 114 returns a password changed at block 475. The system then stores the generated hash at block 480 for future verification operations. In such an example, the generated hash stored at block 480 would become the stored hash retrieved at block 450 in future verification operations.

Figure 5:
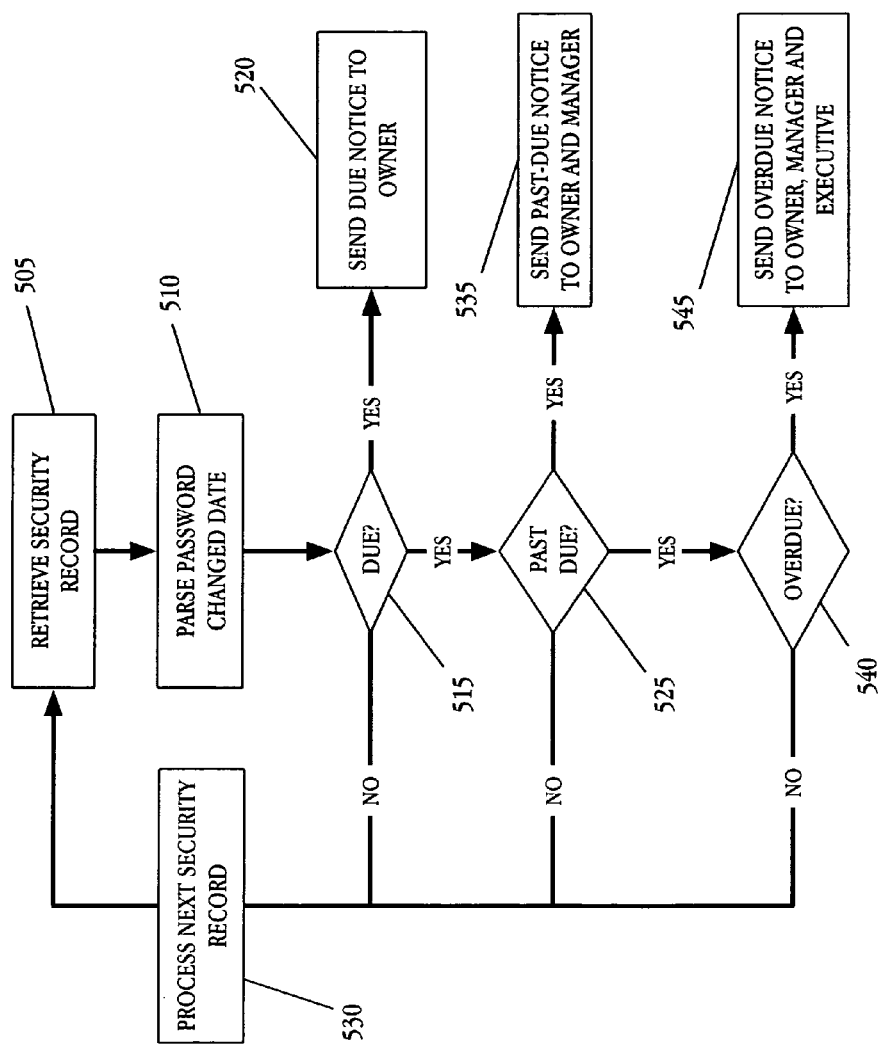
FIG. 5 shows a flowchart of a method of monitoring software application security management, in accordance with an example embodiment.

FIG. 5 shows a flowchart of a method of accessing and maintaining software application security settings, in accordance with an example embodiment. In an embodiment, the method depicted in FIG. 5 may be carried out by the service account management system shown in FIGS. 3A and 3B and described above. In an embodiment, the operations depicted in FIG. 5 are intended to periodically determine which passwords are due, past-due, or overdue for changing by the owner of the service account. The operations depicted in FIG. 5 are meant to be one in a series of operations for all or some of the security records maintained by the service account management system.

At block 505, a security record is retrieved from the security record data store. At block 510, the password changed date is parsed from the record. This date reflects the last time that the owner of the service account indicated to the service account management system 114 that the password had been changed. At block 515, the service account management system 114 determines if the password is due to be changed. The due date for password change can be a date contained within the security record, in which case it would be parsed from the security record along with the password change data at block 510. The due data may also be derived by date operations on the password date changed field and periodicity information, either contained within the security record or globally set for all security records. Such periodicity information, for example, would denote that the password requires changing every year. Applying that periodicity information to the password change date, say Jan. 1, 2006, would yield a due date of Jan. 1, 2007. The determination that the password is due to be changed at block 515 may be a simple comparison to the present date, or additional logic may be applied. For example, as the operations in FIG. 5 are intended to notify owners that passwords need to be changed, a password may be due for changing when it is within a certain period of that derived date, say 90 days. In this example, and applying the above example, the password would be due for changing by Oct. 1, 2006. If the present data, or today's date, is greater than this date, the determination would be yes at block 515 that the password is due for change. If the password is due for changing, operations proceed to block 520 where a message is sent to the owner of the service account associated with that service record, the message indicating to the owner that the password is due for a change. Additionally operations proceed to block 525 for further determinations regarding past due can be made. If the determination at block 515 is that the password is not due for changing, then operations proceed to block 530 where the next security record can be processed for operations.

At block 525, the service account management system 114 determines if the password is past-due for changing. The determination at block 525 is similar to that described above, except insofar as the date derived to be the past-due date would be after the due date. If the determination is made that the password is past due for change, operations proceed to block 535 where a message to that effect would be sent to the owner of the service account, as well as the manager of the owner. Operations would additionally proceed to block 540 where further operations regarding overdue dates can be made. If the determination is made at block 525 that the password is not past-due for change, operations proceed to block 530 where the next security record can be processed for operations.

At block 540, the service account management system 114 determines if the password is overdue for changing. The determination at block 540 is similar to that described above, except insofar as the data derived to be the overdue date would be after the past-due data and the due date. If the determination is made that the password is overdue for change, operations proceed to block 545 where a message to that effect would be sent to the owner of the service account, the manager of the owner, and the executive providing oversight to the manager. If the determination is made at block 540 that the password is not overdue for change, operations proceed to block 530 where the next security record can be processed for operations.

Example Implementations

Figure 6A:
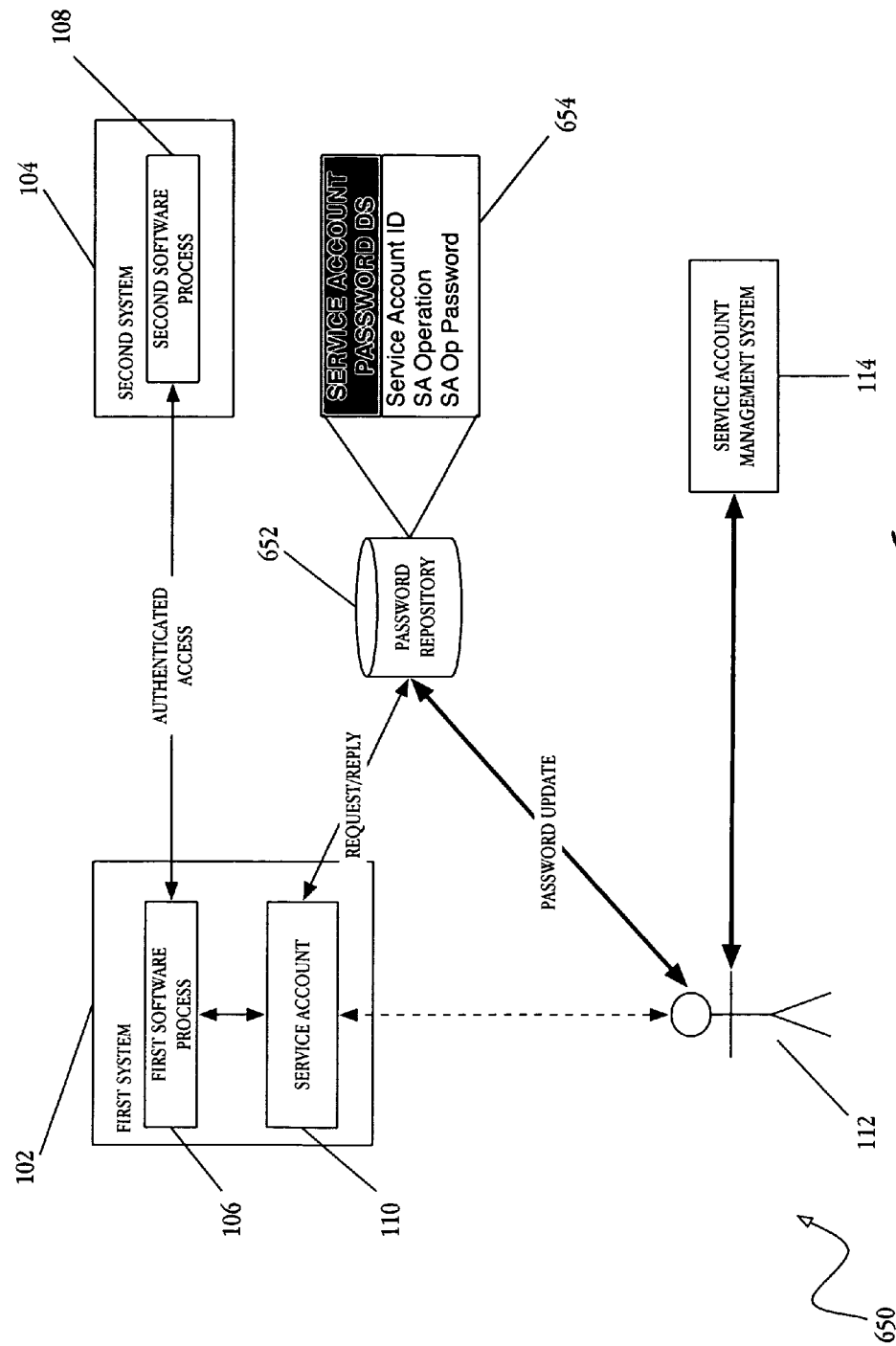
FIG. 6A shows a block diagram of a system that provides software application security management to users, in accordance with an example embodiment.

FIG. 6A shows a block diagram of a system that provides software application security management to users, in accordance with an example embodiment. Apparatus and methods for software application security management have been described above. In the present section, an example implementation will be described to further illustrate the apparatus and methods. This is not meant to be limiting in any manner, and only represents one arrangement of the apparatus previously described and one use of the methods.

In an embodiment, the system 650 includes a user 112 managing the security records for one or more service accounts 110 in a service account management system 114. Each of the service accounts 110 is configured to request a password from a password repository 652, and receive a reply containing the password. The password stored in the password repository 652 is maintained by the user such that the user 112, through interaction with the password repository, can change the password. The user 112 can perform no such action with the service account management system 114. The service account 110 uses the password to perform authenticated operations involving either the computer system the service account resides on, the first system 102, or the first system 102 and the second system 104, or both. In an embodiment, the request/reply between the service account 110 and the password repository 652 is an encrypted request/reply such that the message traffic between the two is relatively secure against attack. In an embodiment, the password repository 652 maintains a service account password data store 654. The service account password data store 654 maintains passwords for one or more service accounts 110 operating. The service account password data store 654 includes at least the following information: a service account ID that identifies the service account 110; a SA Operation that identifies the operation performed by the SA that requires a password; and the SA Operation Password which is the password required for the proper authentication of the Service Account.

The service account 110 may perform more then one discrete operation. An operation relates to one interaction between systems. As one service account may require multiple interactions with multiple systems, each of the service accounts 110 may require more then one password, in one example. For instance, if the service account 110 is concerned with retrieving credit card transaction logs and storing them on the first system 110, it may initiate transactions with more then one external credit card system, such as one system for VISA® transactions, one system for MasterCard® transactions, etc. Each of those transactions may require different passwords, so in storing those passwords in the service account password data store, different entries must be made.

The SA operation entry stores which systems are implicated by the present operation and can be the key to the service account password data store, such that each operation requiring password authentication on the network can have an entry, in one example. This may result in an individual service account 110 having multiple records in the data store. Alternatively, the key to the data store can be the service account 110 resulting in disparate operations performed by the service account having different entries in the data store.

As discussed above, the user 112 maintains security records through the service account management system 114 which track the status of passwords, but maintain no password information. The user 112 through interaction with the password repository 652 can change the password for one or more service accounts 110 that they have responsibility for.

Figure 6B:
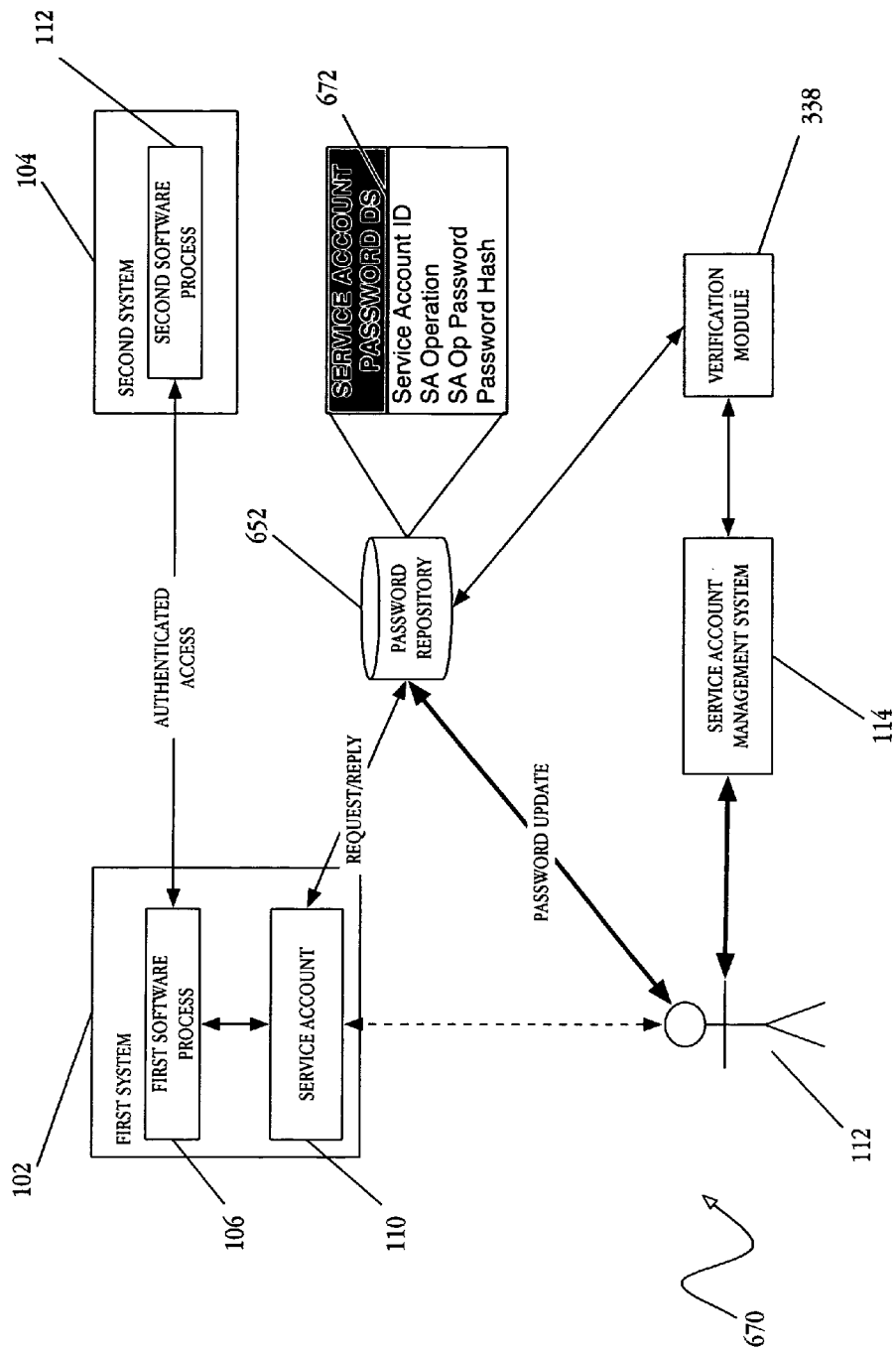
FIG. 6B shows a block diagram of an alternative system that provides software application security management to users, in accordance with an example embodiment.

FIG. 6B shows a block diagram of an alternative system that provides software application security management to users, in accordance with an example embodiment. The system shown in FIG. 6B is similar to that shown above with respect to FIG. 6A, with the addition of a verification module 338 coupled to the service account management system 114 and additional rows in the password repository 652.

As discussed above, the service account management system 114 maintains no password information. The system 670 shown in FIG. 6B depicts a system where a change to the password can be verified while maintaining the security of the password. The service account password data store 672 has additional information related to a hash of the password, which is stored. The password repository 652 has additional functionality to perform hashing functions, in this example. Upon receiving a password from the user 112, the password repository 652 hashes the password and stores the hash in the service account password data store 672.

The service account management system 114 is coupled to a verification module 338, in this example. The verification module 338 may be a separate computer system dedicated to this task, in one example, but may alternatively be contained within the structure of the service account management system 114. In either case, the verification module is configured to receive a generated hash of the password hash from the password repository 652 when the password is first supplied to the password repository 652. The use of the generated hash for exchange between the password repository 652 and the verification module 338 removes the need to operate on the actual password for verification operations. The generated hash is stored by the verification module 338, either internally, or in the security record data store 336, as described above.

When the user 112 indicates that a password has been changed, the verification module 338 can request a generated hash from the password repository 652, which is a hash of the password hash. As discussed above, this has the advantage of never loading the password into memory except when actually requested from the service account 110 for actual operations. The password repository 652 supplies the generated hash to the verification module 338. If the supplied generated hash is equal to the previously stored generated hash, the password has not been changed, and the verification module 338 can pass that information to the service account management system 114 for further action, such as an alert message to the manager of the owner that the owner has falsely indicated that the password has been updated. If the supplied generated hash is not equal to the stored generated hash, then the password has been changed, and the verification module 338 can indicate that to the service account management system 114. The verification module 338 can additionally store the supplied generated hash for future verification operations.

Figure 7:
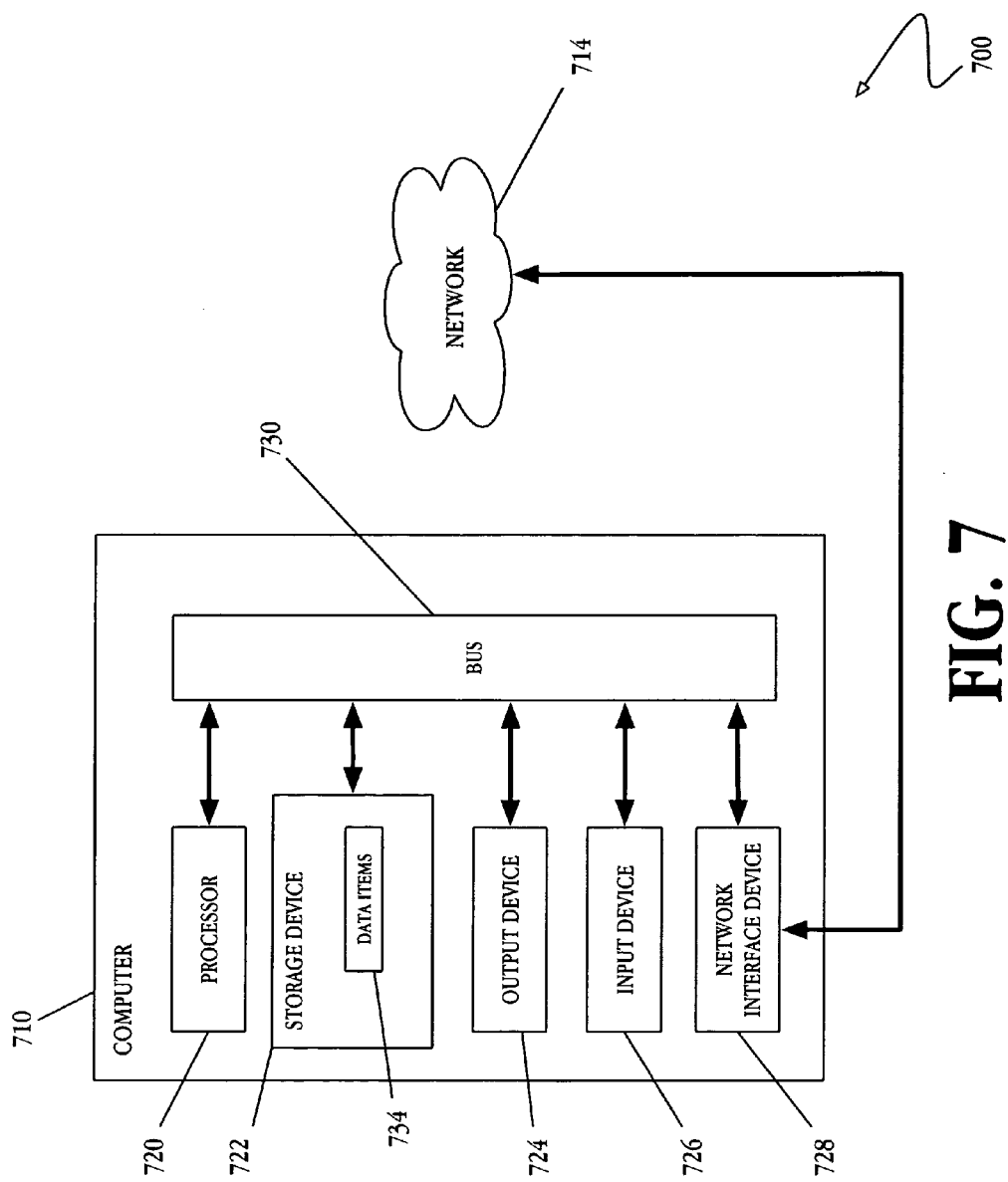
FIG. 7 shows a block diagram of a machine including instructions to perform any one or more of the methodologies described herein.

FIG. 7 shows a block diagram of a machine including instructions to perform any one or more of the methodologies described herein. A system 700 includes a computer 710 connected to a network 714. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the entire computer. Although not depicted in FIG. 7, the processor 720 typically includes a control unit that organizes data and program storage in memory and transfers data and other information between the various parts of the computer 710. The processor 720 receives input data from the input device 726 and the network 714 reads and stores code and data in the storage device 722 and presents data to the output device 724.

Although the computer 710 is shown to contain only a single processor 720 and a single bus 730, the disclosed embodiment applies equally to computers that may have multiple processors and to computers that may have multiple busses with some or all performing different functions in different ways.

The storage device 722 represents one or more mechanisms for storing data. For example, the storage device 722 may include read-only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

The storage device 722 includes a controller (not shown in FIG. 7) and data items 734. The controller includes instructions capable of being executed on the processor 720 to carry out the functions, as previously described above with reference to FIGS. 1-6. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 722 may also contain additional software and data (not shown), which is not necessary to understand the invention.

Although the controller and the data items 734 are shown to be within the storage device 722 in the computer 710, some or all of them may be distributed across other systems, for example on a server and accessed via the network 714.

The output device 724 is that part of the computer 710 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate the user interface previously discussed. Although only one input device 726 is shown, in another embodiment any number and type of input devices may be present.

The network interface device 728 provides connectivity from the computer 710 to the network 714 through any suitable communications protocol. The network interface device 728 sends and receives data items from the network 714.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus to manage service account security, the apparatus comprising:
a processor;
a storage device having machine-readable instructions contained therein which when executed cause the processor to provide the following:
a security record data store containing information regarding a plurality of security records for a number of service accounts, wherein each of the plurality of security records comprises at least update information regarding an updating of the number of service account passwords and a user identification of a service account owner for each of the number of service accounts, wherein the update information includes a date for a password change corresponding to each of the plurality of service records;
a retrieval module coupled to the security record data store, the retrieval module to request and receive security record information and the update information for the number of service accounts;
a user interface module coupled to the retrieval module, the user interface module to receive requests for the security record information from one or more users and to convey the security record information to the one or more users, wherein the one or more users include the owner for each of the number of service accounts, a service account manager that manages the number of service accounts, and an executive of the number of service accounts that provides oversight to the service account manager;
a notification module coupled to the retrieval module, the notification module to periodically request the update information from the security record data store for each of the number of security records, the notification module to send a notification to the owner of the service account that the password requires updating, wherein the notifications escalate such that the executive of a particular service account is additionally notified of the date of the password change for a corresponding security record of the particular service account when a current date is within a predetermined threshold of the date of the password change;

a verification module to use a one-way hashing algorithm to verify whether a password has been updated in a password repository prior to the date of the password change without verifying the password itself; and a confirmation module to send a confirmation message to the service account owner related to the password updated in the password repository.

2. The apparatus of claim 1, wherein the verification module receives a hashed value from the password repository which can be used by the verification module to compare to a future hashed value subsequently received from the password repository, the comparison showing any change to the password stored in the password repository.

3. The apparatus of claim 1, wherein the verification module receives a hashed value from the password repository and subsequently sends that hashed value to the password repository, which is further configured to compare a present hashed value with the sent hashed value, the comparison showing any change to the password stored in the password repository.

4. The apparatus of claim 1, wherein the security record data store is free of any password information, the password information capable of providing authenticated access to a secured system.

5. The apparatus of claim 1, wherein the user interface module conveys the security record information to the user by sending instructions to a computing device of the user, the instructions intended to display on the computing device of the user the security record information.

6. The apparatus of claim 1, wherein the user interface module conveys the security record information to the user by formatting the security record information into an electronic message that can be transmitted across a network to the user.

7. A system to dynamically deliver customized messages to a customer, the system comprising:
   a processor; and
   a storage device having machine-readable instructions contained therein which when executed cause the processor to provide the following:
   a security record data storing containing information regarding a plurality of security records of a number of service accounts, wherein each of the plurality of security records comprises at least update information regarding an updating of the number of service account passwords and a user identification of a service account owner for each of the number of service accounts, wherein the update information includes a date for a password change corresponding to each of the plurality of security records;
   a retrieval module coupled to the security record data store, the retrieval module to request and receive security record information and the update information for the number of service accounts;
   a user interface module coupled to the retrieval module, the user interface module to receive requests for the security record information from one or more users and to convey the security record information to the one or more users, wherein the one or more users include the owner for each of the number of service accounts, a service account manager that manages the number of service accounts, and an executive of the number of service accounts that provides oversight to the service account manager;
   a notification module coupled to the retrieval module, the notification module to periodically request the update information from the security record data store for each of the number of security records, the notification module to send a notification to the owner of the service account that the password requires updating, wherein the notifications escalate such that the executive is additionally notified of the date of the password change for a corresponding security record of the particular service account when a current date is within a predetermined threshold of the date of the password change;
   a verification module to use a one-way hashing algorithm to verify whether a password has been updated in a password repository without verifying the password itself; and
   a confirmation module to send a confirmation message to the service account owner related to the password updated in the password repository.

8. The system of claim 7, wherein the verification module receives a hashed value from the password repository which can be used by the verification module to compare to a future hashed value subsequently received from the password repository, the comparison showing any change to the password stored in the password repository.

9. The system of claim 7, wherein the verification module receives a hashed value from the password repository and subsequently sends that hashed value to the password repository, which is further configured to compare a present hashed value with the sent hashed value, the comparison showing any change to the password stored in the password repository.

10. The system of claim 7, wherein the security record data store is free of any password information, the password information capable of providing authenticated access to a secured system.

11. The system of claim 7, wherein the user interface module conveys the security record information to the user by sending instructions to a computing device of the user, the instructions intended to display on the computing device of the user the security record information.

12. The system of claim 7, wherein the user interface module conveys the security record information to the user by formatting the security record information into an electronic message that can be transmitted across a network to the user.

13. A method of dynamically delivering customized messages to a customer, the method comprising:
   storing one or more security records for a number of service accounts, wherein each of the one or more security records comprises at least update information regarding an updating and maintenance of the number of service account passwords and a user identification of one or more users, wherein the one or more users include a service account owner, a service account manager that manages the number of service accounts, and a service account executive that provides oversight to the service account manager;
   receiving a request for the security record information including the update information for a number of service accounts;
   conveying the one or more security record information including the update information to the one or more users;
   periodically requesting update information and sending a notification to the owner of the service account that the password requires updating;
   escalating the periodic notifications such that the executive is notified in addition to the service account owner of the date of the password change for a corresponding security record of the particular service account when a current date is within a predetermined threshold of the date of the password change;
   using a one-way hashing algorithm to verify whether a password has been updated in a password repository without verifying the password itself; and sending a confirmation message to the service account owner related to the password updated in the password repository.

14. The method of claim 13, wherein verifying includes:
receiving a hashed value from the password repository, the hashed value to be used to compare a future hashed value subsequently received from the password repository, the comparison showing any change to the password.

15. The method of claim 13, wherein verifying includes:
receiving a hashed value from the password repository; and
sending the hashed value to the password repository, wherein the password repository compares the sent hashed value to a present hashed value, the comparison showing any change to the password.

16. The method of claim 13, wherein conveying includes sending instructions to a computing device of the user, the instructions intended to display on the computing the device the security record information.

17. The method of claim 13, wherein conveying includes formatting the security record into an electronic message that can be transmitted across a network to the one or more users.

* * * * *